(12) United States Patent
Egawa (10) Patent No.: US 10,373,406 B2
(45) Date of Patent: Aug. 6, 2019

(54) OPERATION SUPPORT SYSTEM AND WORKING MACHINE INCLUDING OPERATION SUPPORT SYSTEM

(71) Applicant: Hitachi, Ltd., Chiyoda-ku, Tokyo (JP)

(72) Inventor: Saku Egawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 750 days.

(21) Appl. No.: 14/995,607

(22) Filed: Jan. 14, 2016

(65) Prior Publication Data

US 2016/0247332 A1 Aug. 25, 2016

(30) Foreign Application Priority Data

Feb. 25, 2015 (JP) ................................. 2015-034704

(51) Int. Cl.
*G07C 5/08* (2006.01)
*G06N 99/00* (2019.01)
*E02F 9/26* (2006.01)
*G05B 13/04* (2006.01)
*G05B 13/02* (2006.01)
*E02F 3/43* (2006.01)
*G06Q 10/06* (2012.01)
*G07C 5/00* (2006.01)

(52) U.S. Cl.
CPC ............ *G07C 5/0808* (2013.01); *E02F 3/438* (2013.01); *E02F 9/264* (2013.01); *E02F 9/265* (2013.01); *G06Q 10/06* (2013.01); *G07C 5/085* (2013.01); *G07C 5/008* (2013.01)

(58) Field of Classification Search
None
See application file for complete search history.

(56) References Cited

U.S. PATENT DOCUMENTS

2008/0249679 A1 10/2008 Matsuda et al.
2015/0004574 A1* 1/2015 Bomer ..................... G09B 9/04
434/219

FOREIGN PATENT DOCUMENTS

JP 7-160661 A 6/1995
JP 2001-142506 A 5/2001
JP 4173121 B2 10/2008

* cited by examiner

*Primary Examiner* — Robert K Carpenter
(74) *Attorney, Agent, or Firm* — Crowell & Moring LLP (57) ABSTRACT

An operation support system includes an operation data detection unit that detects operation data of a working machine; an operator identification unit that identifies a plurality of operators who operate the working machine; a data accumulation unit that accumulates the operation data and identification information of the plurality of identified operators; a work quality evaluation unit that evaluates work qualities of the plurality of operators and selects the best operator, based on the accumulated data; a learning unit that learns parameters of an operation model of the working machine, based on operation data corresponding to the best operator; and an operation support unit that supports the operators, based on the operation model.

3 Claims, 5 Drawing Sheets

OPERATION SUPPORT SYSTEM AND WORKING MACHINE INCLUDING OPERATION SUPPORT SYSTEM

BACKGROUND OF THE INVENTION

1. Field of the Invention

The present invention relates to an operation support system and a working machine including the operation support system.

2. Description of the Related Art

Conventionally, technology for supporting an operation of a working machine to raise work efficiency of the working machine operated by an operator, such as a shovel, is suggested.

An example of technology for supporting the operation by providing information to the operator is described in Japanese Patent No. 4173121 as follows. An operating system of a construction machine includes a setting unit that sets a setting target value for a frequency distribution of a predetermined state value regarding an operating situation of the construction machine, a detection unit that detects the predetermined state value, and a control unit that calculates the frequency distribution of the predetermined state value detected by the detection unit, compares the calculated frequency distribution and the setting target value set by the setting unit, and outputs a prepared message, according to a comparison result.

In addition, an example of technology for supporting the operation by learning the operation of the operator is described in Japanese Patent Application Laid-Open No. 2001-142506 as follows. A controller that can learn a control law, that is, sequentially modify a function relation of an input and an output and execute optimization is interposed between an operation tool and a drive unit of a vehicle. The controller receives an operation signal output by the operation tool and a sensor signal to detect a work environment and an internal situation of the vehicle and outputs an operation command sent to the drive unit. Switching of learning and reproduction can be performed manually by the operator. However, the learning and the reproduction can be automatically switched by automatically determining a degree of skill, when there is a significant difference in handling of the operation tool of a skilled operator and an unskilled operator, that is, a time change of an input signal.

In addition, an example of technology for automatically extracting teacher data to reconstruct a neural network is described in Japanese Patent Application Laid-Open No. 7-160661 as follows. An automatic teacher data extraction method of a neural network (which constructs a self-growth-type neural network to additionally learn newest teacher data by automatic learning and performs a recall to calculate an output prediction value from a plurality of input parameters) for extracting the teacher data based on a control result, sorting the teacher data for each pattern of each input parameter, and configuring each database is suggested.

SUMMARY OF THE INVENTION

To obtain a high work quality by the operation support of the working machine, a norm of an ideal operation is necessary. Here, the work quality is a quantitative index to evaluate work efficiency. For example, when the working machine is a hydraulic shovel, a cycle time of excavation/loading, a transportation amount, fuel consumption, and finishing accuracy to a target ground shape can be used.

When information to advise the operator on the operation is provided, it is necessary to compare the operation of the operator with the ideal operation. In the working machine such as the hydraulic shovel, a work environment changes whenever the work is performed and the ideal operation also changes. For this reason, an operation model to generate the norm of the ideal operation according to the work environment is necessary.

Because it is difficult to manually generate the operation model of the complex work by the working machine such as the hydraulic shovel, it is effective to perform learning from recording data of the operation by the operator. To learn a good work model, a large amount of data of an operation of a good work quality is necessary. In addition, because the work environment changes whenever the work is performed and changes when the work advances, it is necessary to collect the large amount of data continuously and perform the learning repetitively. However, because the work quality of the collected data is not entirely good, it is necessary to select the data. Particularly, when a large amount of recording data is handled, manual selection of the data requires a large cost. For this reason, it is necessary to select the data automatically.

In the example of Japanese Patent No. 4173121, because the setting target value for the frequency distribution of the predetermined state value regarding the operating situation of the construction machine is set by the setting unit, it is not possible to correspond to a change in the work environment. As a result, an optimal message may not be output.

In addition, in the example of Japanese Patent Application Laid-Open No. 2001-142506, the learning and the reproduction can be automatically switched by automatically determining the degree of skill, when there is a significant difference in handling of the operation tool of the skilled operator and the unskilled operator, that is, the time change of the input signal. However, because a large difference is generated in the work quality due to a minute difference of the operation in general, it is difficult to automatically determine the degree of skill from the input signal.

In addition, in the example of Japanese Patent Application Laid-Open No. 7-160661, the teacher data is extracted based on the control result, that is, the work quality. However, in the work by the working machine such as the hydraulic shovel, the work environment greatly changes whenever the work is performed and the ideal work quality also changes. For this reason, it is difficult to evaluate the degree of skill from only the work quality.

The present invention has been made to resolve the above problem and an object of the present invention is to provide an operation support system and a working machine including the operation support system that are adapted to environment conditions of various works by automatically selecting and learning data from which a high work quality is obtained and realize the high work quality.

An aspect of the present invention for resolving the above problem is as follows:

An operation support system including: an operation data detection unit that detects operation data of a working machine; an operator identification unit that identifies a plurality of operators who operate the working machine; a data accumulation unit that accumulates the operation data and identification information of the plurality of identified operators; a work quality evaluation unit that evaluates work qualities of the plurality of operators and selects the best operator, based on the accumulated data; a learning unit that learns parameters of an operation model of the working machine, based on operation data corresponding to the best operator; and an operation support unit that supports the operators, based on the operation model.

The present invention can support an operation of an operator according to environment conditions of various works.

BRIEF DESCRIPTION OF THE DRAWINGS

Other objects and advantages of the invention will become apparent from the following description of embodiments with reference to the accompanying drawings in which.

DESCRIPTION OF THE PREFERRED EMBODIMENTS

Preferred embodiments of the present invention will be described in detail below with reference to the accompanying drawings, wherein like reference numerals refer to like parts throughout. The present invention is not limited to the embodiments and various changes and modifications can be made by those skilled in the art, in a range of the technical spirit disclosed in the present specification.

In the following description, an example of the case in which the present invention is applied to a hydraulic shovel corresponding to a working machine is illustrated. However, the present invention is not limited thereto and can be applied to a working machine operated and adjusted by people, such as a machine tool, a vehicle, and an industrial plant.

Figure 1:
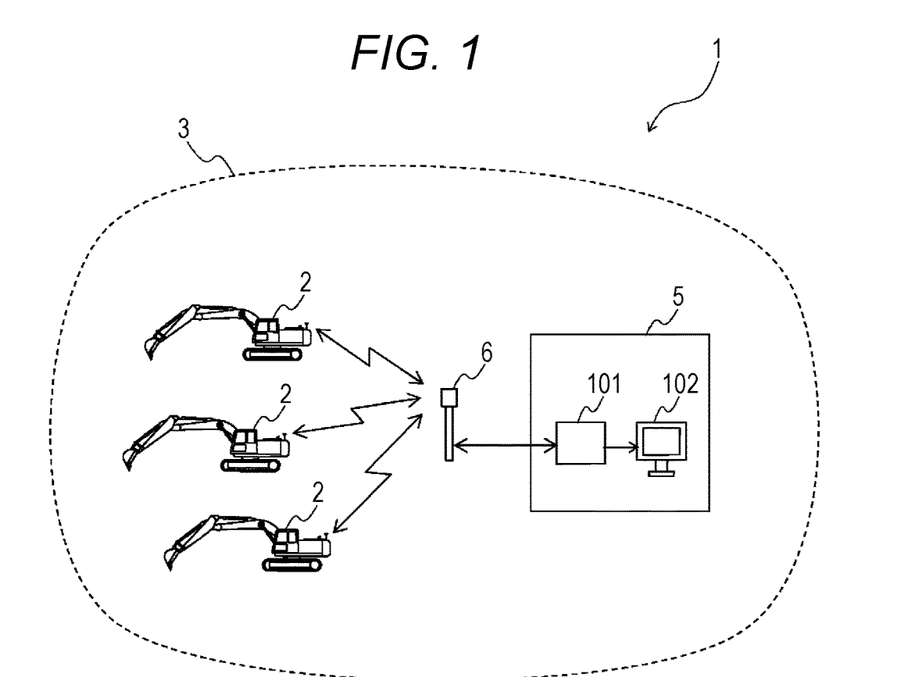
FIG. 1 is a system configuration diagram of an operation support system according to an embodiment of the present invention.

FIG. 1 illustrates a system configuration diagram of an operation support system 1 according to the present invention. Hydraulic shovels 2 to be a plurality of working machines are disposed at a work site 3. Here, the work site 3 corresponds to one work site such as a mine site and a public work site. An operator not illustrated in the drawings boards each of the hydraulic shovel 2, operates the hydraulic shovel 2, and performs work. A plurality of operators alternately board one hydraulic shovel 2 to perform the work continuously.

In addition, a management center 5 is provided at the work site 3. The hydraulic shovel 2 and the management center 5 are connected by a wireless and/or wired communication system 6 and data transmission from the hydraulic shovel 2 to the management center 5 and parameter transmission from the management center 5 to the hydraulic shovel 2 are performed. An integrated control device 101 and a management display 102 are included in the management center 5 and data transmitted from the hydraulic shovel 2 and an analysis result thereof are provided to a manager (not illustrated in the drawings).

Figure 2:
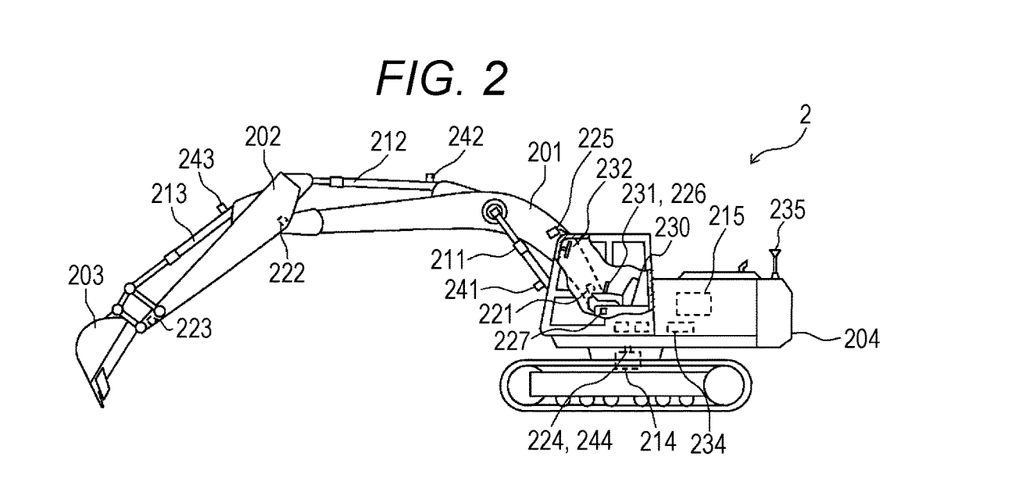
FIG. 2 is a lateral view of a shovel according to the embodiment of the present invention.

FIG. 2 is a lateral view illustrating a structure of the hydraulic shovel 2 including the operation support system 1 according to the present invention. The hydraulic shovel 2 includes a boom 201, an arm 202, a bucket 203, an upper turning body 204, a boom cylinder 211, an arm cylinder 212, a bucket cylinder 213, and a turning motor 214 to be hydraulic actuators to drive the boom, the arm, the bucket, and the upper turning body, and an actuator drive device 215 to drive these hydraulic actuators. The hydraulic shovel 2 further includes a boom hydraulic sensor 241, an arm hydraulic sensor 242, a bucket hydraulic sensor 243, and a turning hydraulic sensor 244 to detect hydraulic pressures of the hydraulic actuators.

The hydraulic shovel 2 further includes a boom angle sensor 221, an arm angle sensor 222, a bucket angle sensor 223, and a turning angle sensor 224 to detect an operation state and a camera 225 to be an environment sensor to detect a state of a work environment.

The hydraulic shovel 2 further includes a driver seat 230 where an operator (not illustrated in the drawings) boards, an operation lever 231 that is operated by the operator, an operation amount sensor 226 that detects an operation amount of the operation lever 231, a display 232 that provides operation support information to the operator, and an operator identification sensor 227 (operator identification unit) that identifies a plurality of operators who operate the working machine. Here, the operator identification sensor 227 identifies each operator. For example, the operator identification sensor 227 detects a wireless tag carried by the operator and obtains identification information.

The hydraulic shovel 2 further includes a vehicle control device 234 that collects work data based on information of the sensors, generates information provided to the display 232, and generates a control signal provided to the actuator drive device 215. The hydraulic shovel 2 has a wireless communication device 235 to perform communication via the communication system 6 to perform communication between the vehicle control device 234 and the management center 5, which is mounted thereon.

The operator operates the operation lever 231, drives the boom cylinder 211, the arm cylinder 212, and the bucket cylinder 213, and performs the work. However, a work quality is improved by providing the operation support information to the operator through the display 232. In addition, the work quality is improved by changing a part of the operation of the operator by a control signal provided from the vehicle control device 234 to the actuator drive device 215.

Figure 3:
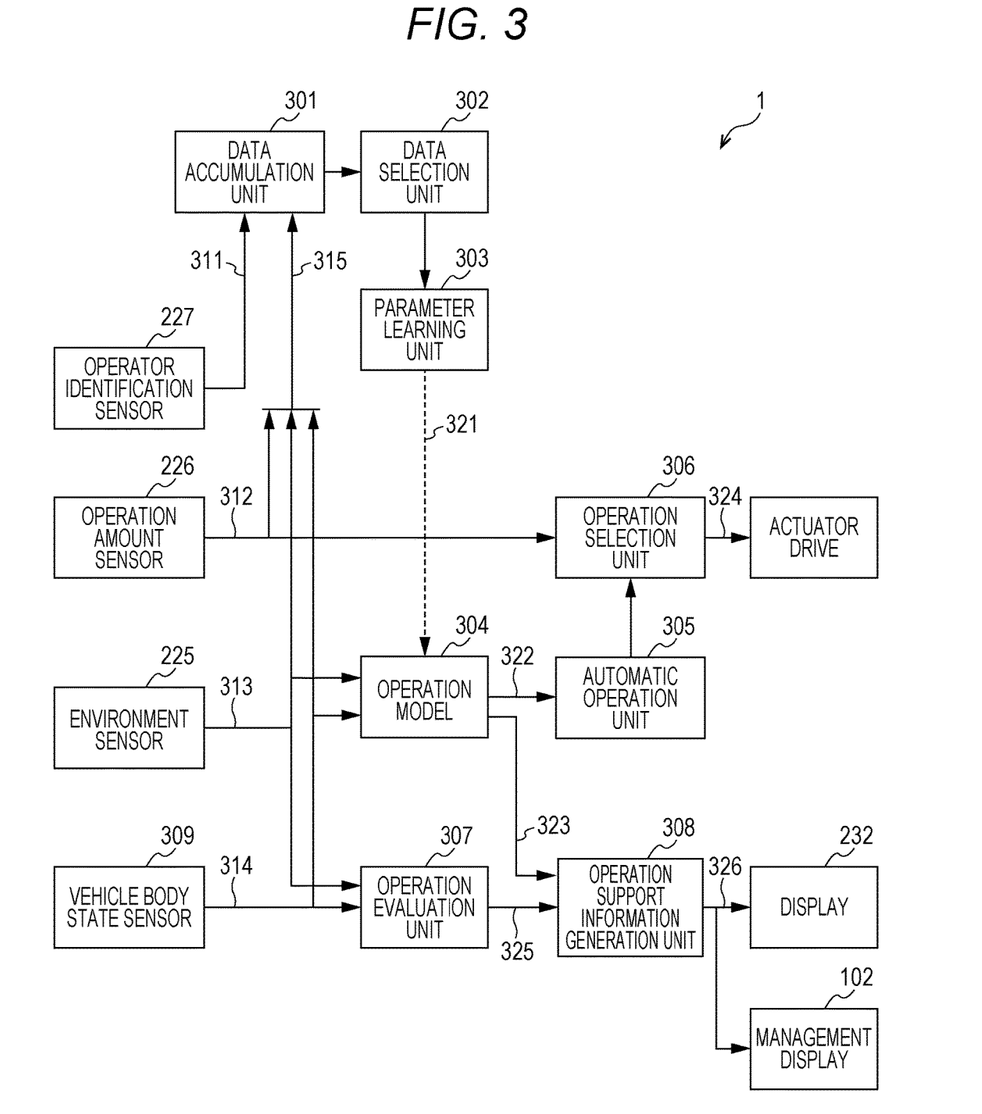
FIG. 3 is a block diagram of the operation support system according to the embodiment of the present invention.

FIG. 3 is a block diagram illustrating a configuration of an information processing/control system in the operation support system according to the present invention. A function of information processing/control in the operation support system 1 is realized by software mounted on the integrated control device 101 provided in the management center 5 and the vehicle control device 234 provided in the hydraulic shovel 2.

A data accumulation unit 301 (data accumulation unit) accumulates an operator identifier 311 obtained by the operator identification sensor 227 and operation data 315 in a storage device such as a semiconductor memory and a magnetic storage device. In other words, the data accumulation unit 301 accumulates the operation data 315 and the identification information of the plurality of operators.

Figure 4:
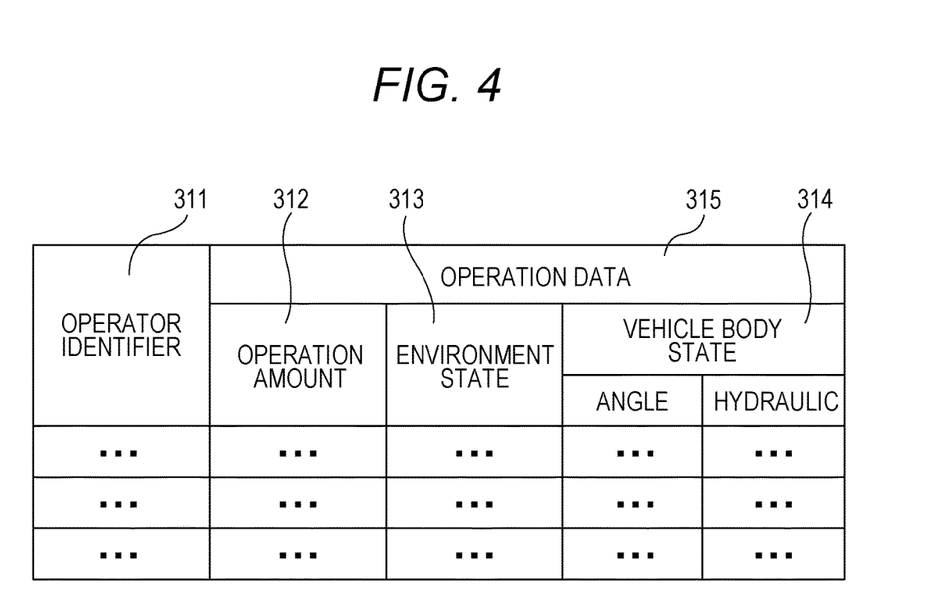
FIG. 4 is an item table of recording data according to the embodiment of the present invention.

A structure of recorded data is illustrated in FIG. 4. Here, the operation data 315 collects an operation amount 312 obtained by the operation amount sensor 226, an environment state 313 obtained by the environment sensor 225, and a vehicle body state 314 obtained by a vehicle body state sensor 309. In addition, the vehicle body state sensor 309 (operation data detection unit) to detect the operation data of the working machine means a collection of the boom angle sensor 221, the arm angle sensor 222, the bucket angle sensor 223, the turning angle sensor 224, the boom hydraulic sensor 241, the arm hydraulic sensor 242, the bucket hydraulic sensor 243, and the turning hydraulic sensor 244 to be sensors relating to a state of a vehicle body.

A data selection unit 302 reads the operation data 315 from the data accumulation unit 301 and selects valid data to raise the work quality by a sequence to be described below.

A parameter learning unit 303 (learning unit) learns a parameter of an operation model 304 using the operation data 315 selected by the data selection unit 302 and sets an operation model parameter 321 of a learning result to the operation model 304. In other words, the parameter learning unit 303 learns the parameter of the operation model 304 of the working machine, based on the operation data 315 corresponding to the best operator.

The operation model 304 is a function for generating an operation target 322 and an operation evaluation index standard 323 (standard of a work index) from the environment state 313 and the vehicle body state 314 obtained from the environment state sensor 225 and the vehicle body state sensor 309 and is created by a method of learning a parameter from teacher data of an input and an output such as a neural network.

Here, the operation target 322 shows an operation position (operation point) such as a position of the bucket in a preferable operation and the actuator is driven using the operation target as a target. In addition, the operation evaluation index standard 323 is a value to be a standard of an evaluation index to be described below and shows an expectation value in the preferable operation.

An automatic operation unit 305 generates an operation command 324 to cause an operation of the vehicle body to approach to the operation target 322, based on the operation target 322, the environment state 313, and the vehicle body state 314.

An operation selection unit 306 switches a manual operation and an automatic operation by the operator. In the case of the manual operation, the operation selection unit 306 transmits the operation amount 312 obtained by the operation amount sensor 226 to the actuator drive device 215 and in the case of the automatic operation, the operation selection unit 306 changes the operation amount 312 partially or entirely according to the operation command 324 generated by the automatic operation unit 305 and transmits the operation amount to the actuator drive device 215.

An operation evaluation unit 307 (work quality evaluation unit) calculates an operation evaluation index 325 (work index) from the operation amount 312, the environment state 313, and the vehicle body state 314. Here, the operation evaluation index 325 is an index to evaluate a characteristic of the operation quantitatively. For example, a work quality such as a cycle time is one of evaluation indexes. In addition, the frequency of a specific operation state such as a stop state can be used as the evaluation index. The operation evaluation unit 307 evaluates work qualities of a plurality of operators and selects the best operator, based on the data accumulated in the data accumulation unit 301.

An operation support information generation unit 308 (operation support unit) compares the operation evaluation index 325 calculated by the operation evaluation unit 307 and the operation evaluation index standard 323 generated by the operation model 304, generates operation support information 326 such as an operation advice, and displays the operation support information 326 on the display 232. In addition, the operation target 322 of the automatic operation generated by the operation model 304 is visualized and is displayed on the display 232. The information displayed on the display 232 is transmitted to the management center 5 and is also displayed on the management display 102. In other words, the operation support information generation unit 308 supports the operator, based on the operation model 304.

A sequence of accumulation, selection, and learning of the data will be described using a flowchart illustrated in FIG. 5.

First, the data is accumulated. The operator identifier 311 and the operation data 315 are recorded on the data accumulation unit 301 (step 501). Next, it is determined whether a predetermined data recording period ends (step 502). When the recording period does not end, the data accumulation of step 501 is repeated and when the recording period ends, the process proceeds to the following data selection step.

In the data selection, first, the operation data of the first operator is selected and extracted from the data accumulated in the data accumulation unit 301 (step 503). An average work quality of the entire data of the selected data is calculated and is stored (step 504). It is determined whether calculation of the average work quality of the data of all of the operators is completed (step 505). When the calculation is not completed, the operation data of the next operator is selected (step 506) and the calculation of the average work quality of step 504 is repeated.

When the calculation is completed, the operator having the maximum average work quality is selected from all of the operators (step 507) and the operation data of the operator is extracted from the data accumulation unit 301 (step 508).

The operation model is learned using the finally extracted operation data and the operation model parameter 321 is generated (step 509). Then, the sequence is repeated from step 501.

Hereinafter, functions of an operation support system according to an embodiment of the present invention and a working machine including the operation support system will be described.

If the operator boards the driver seat 230 of the hydraulic shovel 2, the operator identification sensor 227 reads the operator identifier 311 from the wireless tag carried by the operator.

If the operator operates the operation lever 231 and performs the work, the operator identifier 311 and the operation data 315 including the operation amount 312, the environment state 313, and the vehicle body state 314 obtained from the operation amount sensor 226, the environment state sensor 225, and the vehicle body state sensor 309 are transmitted to the integrated control device 101 of the management center 5 via the wireless communication device 235 and the communication system 6 and are recorded on the data accumulation unit 301.

Figure 5:
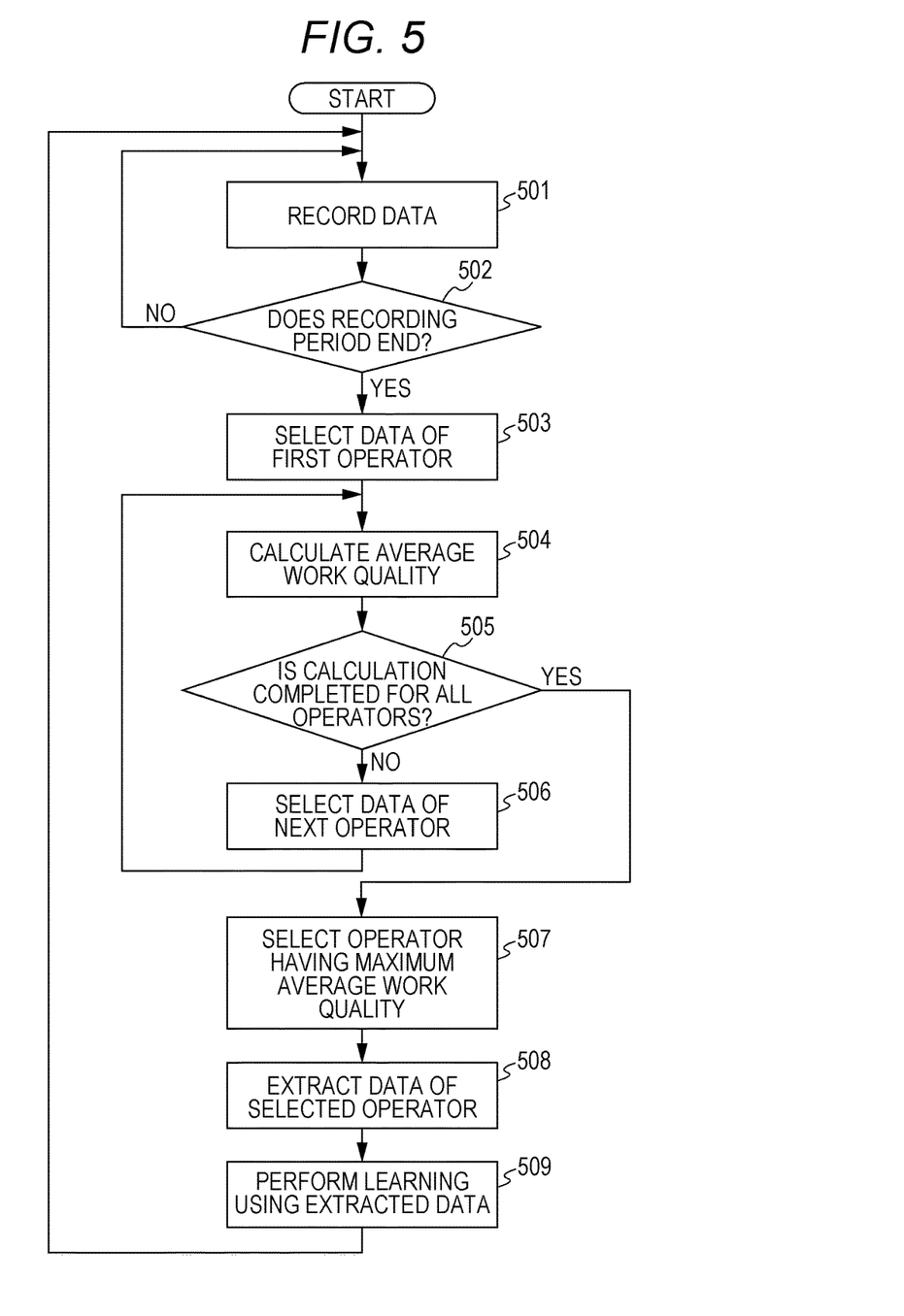
FIG. 5 is a flowchart illustrating a learning sequence according to the embodiment of the present invention.

As illustrated in the flowchart of FIG. 5, if the operation data 315 is accumulated during a predetermined period, selection and learning of the data are performed. Here, the predetermined period is long sufficiently to collect data of a large number of different operators and is determined in a range in which a work environment does not change greatly. For example, in the case in which continuous work is performed by shift work, if a period of the shift work of one cycle is defined as one set, the predetermined period is determined as one to several sets.

The data selection unit 302 evaluates the work quality of each operator from the accumulated operation data 315, compares the work qualities between the operators, and selects the data. Because the work environment changes every hour, the works under the various environment conditions are included in the operation data 315 and the work qualities also change.

Therefore, the average work quality of the entire recording data is calculated for each operator and is used for the evaluation. For example, when the cycle time of the excavation/loading work is used as the work quality, large excavation/loading cycles are included in the recording data of one operator. The average value of the cycle times is used as the average work quality of the operator. As a result, an influence of the variation of the work quality due to the variation of the work environment in each work can be excluded and the work quality of each operator can be compared and evaluated. The average work qualities of all of the operators are calculated by the above method and are compared with each other, the operator whose work quality is best, that is, the most excellent operator is selected, and the operation table of the operator is extracted and is delivered to the parameter learning unit 303. As a result, the operation model 304 to generate the operation norm having the superior work quality can be obtained.

The parameter learning unit 303 generates the parameter 321 of the operation model 304 using the selected operation data 315. First, the parameter learning unit 303 calculates an operation point such as a bucket position from the operation data 315. In addition, the parameter learning unit 303 calculates the operation evaluation index 325, similar to the operation evaluation unit 307. The parameter learning unit 303 uses the environment state 313 and the vehicle body state 314 as teacher data of an input and the operation point and the operation evaluation index 325 as teacher data of an output, learns the operation model 304 by a back propagation method using the teacher data, and obtains the operation model parameter 321. As a result, the operation model 304 using the environment state 313 and the vehicle body state 314 as the input and the target of the operation point and the operation evaluation index as the output is obtained.

Using the operation model 304 obtained as described above, the operation support is performed as follows.

The operation evaluation unit 307 generates the operation evaluation index 325 such as the cycle time and the frequency of each operation state, using the operation amount 312, the environment state 313, and the vehicle body state 314. In addition, the operation model 304 estimates an operation evaluation index value obtained when a superior operation is executed, from the environment state 313 and the vehicle body state 314, based on the operation model parameter 321, and outputs the operation evaluation index value as the operation evaluation index standard 323. The operation support information generation unit 308 compares the operation evaluation index 325 and the operation evaluation index standard 323 and generates the operation support information 326 to advise the operator on the operation, when a difference is large. For example, when the frequency of the stop state is larger than a reference value, the operation support information generation unit 308 generates a message urging the operator to reduce the stop state. The operator views the display 232, accepts the advice, and performs the work according to the advice or in consideration of the advice. Therefore, the work quality is improved.

In addition, the operator switches the operation selection unit 306 into the automatic operation, according to necessity. At this time, the operation model 304 outputs the operation target 322 such as the position of the bucket 203 when the superior operation is executed, from the environment state 313 and the vehicle body state 314. The automatic operation unit 305 acquires the operation command 324 to guide the vehicle body to the operation target 322, from the operation target 322 and the vehicle body state 314. For example, when the operation target 322 is the position of the bucket 203, the automatic operation unit 305 calculates a lever operation amount to guide the bucket to the position and outputs the lever operation amount as the operation command 324. The operation selection unit 306 changes the operation amount 312 partially or entirely according to the generated operation command 324 and transmits the operation amount to the actuator drive device 215. As a result, a part or an entire portion of the operation of the operator is changed by the operation model 304 learning the superior operation, that is, the operation support information generation unit 308 changes the part of the operation of the operator, based on the operation target 322. Therefore, the work quality is improved. When the automatic operation is executed, the operator does not execute the lever operation. Therefore, the data accumulation unit 301 does not perform the data accumulation.

The reason why the operation command for the actuator is not generated directly by the operation model 304, the operation target 322 is generated by the operation model 304, and the operation command is generated by the automatic operation unit 305 such that the operation is matched with the operation target 322 is that the operation of the actuator is strongly affected by disturbance such as force applied from the outside, the operation command needs to be greatly adjusted at a high speed according to the disturbance, and it is difficult to directly learn the operation command. An operation matched with a learning criterion can be executed by the operator by generating the operation target 322 by the operation model 304 by learning and executing feedback control based on control logic by the automatic operation unit 305.

As described above, the data selection unit 302 first selects the operator whose work quality is high, extracts the data of the operator, and selects the data. An effect of the present invention will be described using FIG. 6.

Figure 6:
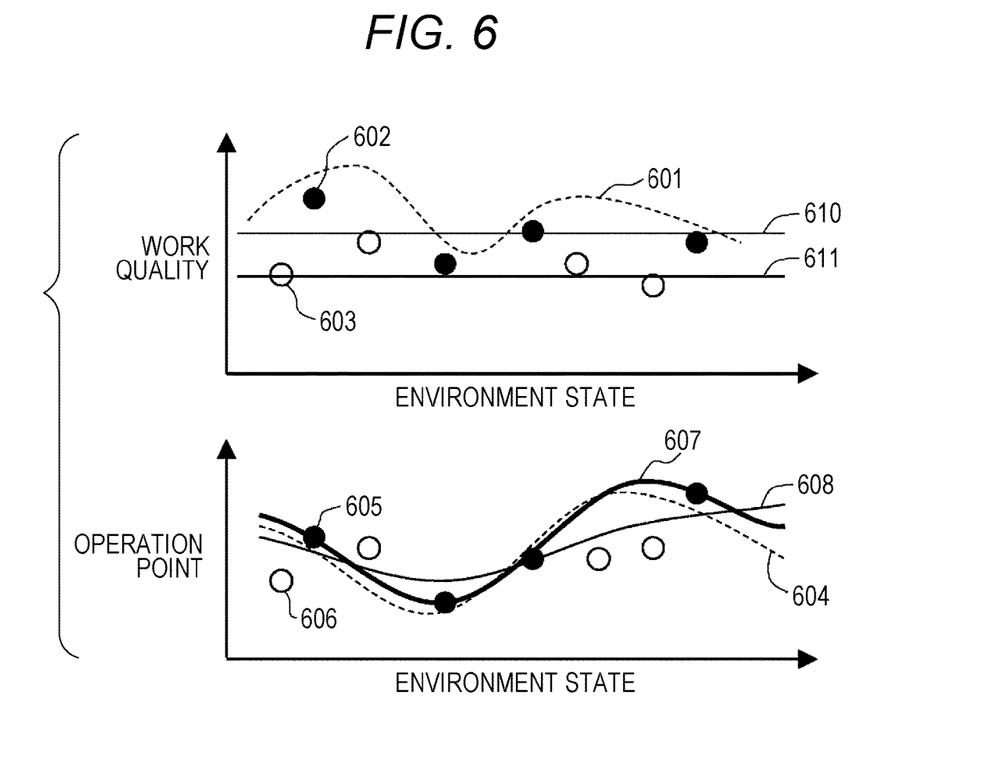
FIG. 6 is a graph illustrating an effect according to the present invention.

FIG. 6 is a graph schematically illustrating a relation of a state of a work environment and a work quality obtained in the state and an operation point at that time. A best work quality 601 obtained by the working machine is generally unknown and changes complicatedly according to the environment state. A best operation point 604 where the best work quality 601 is obtained also changes according to the environment state.

Here, a plurality of operators A with a high degree of skill and a plurality of operators B with a low degree of skill perform work several times, work quality data 602 (a group of black dots) of the plurality of operators A, work quality data 603 (a group of white dots) of the plurality of operators B, operation point data 605 (a group of black dots) of the work by the plurality of operators A, and operation point data 606 (a group of white dots) of the work by the plurality of operators B are obtained. The environment changes whenever the work is performed and the obtained work quality also changes. However, because the operators A have the high degree of skill, the work quality is close to the best work quality 601 even under any environment.

Meanwhile, the work quality obtained by the operators B with the low degree of skill is deteriorated from the best work quality under the environment. The best work quality 601 is different according to an environment condition. For this reason, if individual data is compared, the work quality of the operators B may be better than the work quality of the operators A. If data including various environment conditions is averaged and compared, an average work quality 610 of the operators A is better than an average work quality 611 of the operators B.

In addition, if the operation point data 605 of the work by the operators A and the operation point data 606 of the work by the operators B are compared, the operation point data 605 of the work by the operators A with the high degree of skill is close to the best operation point 604.

In the embodiment of the present invention, because the work quality of each operator is averaged and compared and the operator is selected, the operator with the high degree of skill, from which the work quality close to the best work quality is obtained, can be selected. In addition, because the parameter 321 of the operation model 304 is learned from the data of the selected operator, an operation model outputting a value close to the best operation point 604 is obtained as illustrated in a learning result 607 from the data of the operators A of FIG. 6. As a result, a good operation model can be obtained with respect to a result 608 obtained from the data of all of the operators and a high work quality is obtained.

In the embodiment, the example of the case in which the functions of the data accumulation, learning, and control are provided in the vehicle control device 234 mounted in the hydraulic shovel 2 and the integrated control device 101 disposed in the management center 5 has been described. However, the arrangement of the functions is not limited to the above example and the functions may be arbitrarily arranged. For example, a device mounted in the hydraulic shovel 2 may be simplified by providing a large number of functions in the integrated control device 101. In contrast, the management center 5 may be simplified by providing a large number of functions in the vehicle control device 234. In the above example, the management center 5 is provided at the work site 3. However, management centers of a plurality of sites may be integrated and the integrated management center may be disposed in a place different from the work site.

What is claimed is:

1. An operation support system comprising:
   a working machine;
   a plurality of vehicle body state sensors arranged on the working machine that detect operation data representing structural states of the working machine;
   an operator identification sensor that identifies a plurality of operators who operate the working machine by detecting an identification device of each of the operators;
   a data accumulation unit that accumulates the operation data and identification information of the plurality of identified operators;
   a work characteristic evaluation unit that evaluates work characteristics of the plurality of operators by averaging the work characteristics for each operator over a plurality of work environment states and comparing the average work characteristics of the plurality of operators, and selects an operator from among the plurality of operators, based on a comparison result of comparing the average work characteristics of the plurality of operators;
   a learning unit that learns parameters of an operation model of the working machine, based on operation data corresponding to the selected operator; and
   an operation support unit that supports the plurality of operators, based on the operation model.

2. The operation support system according to claim 1, wherein:
   the work characteristic unit calculates a work index,
   a standard of the work index is generated by the operation model, and
   the operation support unit provides support information to the operators, based on the work index and the standard of the work index.

3. The operation support system according to claim 1, wherein:
   an operation target of the working machine is generated by the operation model, and
   the operation support unit changes a part of operations of the operators, based on the operation target.

* * * * *